(12) United States Patent
Shionoya et al.

(10) Patent No.: US 8,545,765 B2
(45) Date of Patent: Oct. 1, 2013

(54) PLASMA TREATING APPARATUS

(75) Inventors: Wataru Shionoya, Okazaki (JP); Naohiro Shimizu, Miura (JP); Yuichiro Imanishi, Nagoya (JP); Sozaburo Hotta, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/450,853

(22) Filed: Apr. 19, 2012

(65) Prior Publication Data

US 2012/0199286 A1    Aug. 9, 2012

Related U.S. Application Data

(63) Continuation of application No. PCT/JP2010/068972, filed on Oct. 26, 2010.

(30) Foreign Application Priority Data

Nov. 27, 2009   (JP) ................................. 2009-269700

(51) Int. Cl.
*B01J 19/08* (2006.01)
(52) U.S. Cl.
USPC .................................................. 422/186.05
(58) Field of Classification Search
USPC ........................................ 422/186.04, 186.05
See application file for complete search history.

(56) References Cited

U.S. PATENT DOCUMENTS

| 6,562,386 B2 * | 5/2003 | Ruan et al. ..................... 426/237 |
| 6,811,757 B2 * | 11/2004 | Niv et al. ................. 422/186.04 |
| 2006/0115391 A1 | 6/2006 | Kim et al. |
| 2008/0050291 A1 | 2/2008 | Nagasawa et al. |
| 2009/0178915 A1 | 7/2009 | Otaka et al. |

FOREIGN PATENT DOCUMENTS

| JP | 05-051952 U | 7/1993 |
| JP | 2006-510187 A1 | 3/2006 |
| JP | 2006-100031 A1 | 4/2006 |
| JP | 2006-114450 A1 | 4/2006 |
| JP | 2006-269095 A1 | 10/2006 |
| JP | 2009-054557 A1 | 3/2009 |

OTHER PUBLICATIONS

International Search Report dated Nov. 22, 2010.

* cited by examiner

*Primary Examiner* — Kishor Mayekar
(74) *Attorney, Agent, or Firm* — Burr & Brown

(57) ABSTRACT

A first electrode, a second electrode and a third electrode are provided in a middle of a passage. The second electrode is provided on an upstream side of the first electrode, and the third electrode is provided on a downstream side of the first electrode. A connecting line connects the first electrode to a first pole of a pulsed power supply, and connects the second electrode and the third electrode to a second pole of the pulsed power supply. The first electrode crosses a first gas passing surface and occupies a part of the first gas passing surface. The second electrode and the third electrode cross a second gas passing surface and a third gas passing surface and occupy a part of the second gas passing surface and the third gas passing surface respectively.

13 Claims, 10 Drawing Sheets

PLASMA TREATING APPARATUS

BACKGROUND OF THE INVENTION

1. Field of the Invention

The present invention relates to a plasma treating apparatus.

2. Description of Related Art

Patent Document 1 discloses an example of a conventional plasma treating apparatus. In the plasma treating apparatus of the Patent Document 1, a cathode is provided in a middle of a passage and a bar-shaped anode is provided in an extension in an axial direction of the passage toward an upstream side from the cathode in the middle of the passage. In the plasma treating apparatus of the Patent Document 1, a pulse voltage is applied to a portion between the anode and the cathode so that a discharge is generated between a tip of the anode and the cathode.

PRIOR ART DOCUMENT

Patent Document

Patent Document 1: Japanese Patent Application Laid-Open No. 2006-269095

SUMMARY OF THE INVENTION

The plasma treating apparatus of the Patent Document 1 has a problem in that a range for a generation of a plasma is limited, resulting in an insufficient efficiency of a treatment through a plasma. Moreover, the plasma treating apparatus of the Patent Document 1 has a problem in that an electric field concentrates on a tip of the anode so that the anode is damaged in some cases, resulting in an insufficient durability of the anode.

The present invention has been made to solve these problems and has an object to provide a plasma treating apparatus which enhances an efficiency of a treatment through a plasma and improves a durability of an electrode.

Means for solving the problems will be described below.

A first aspect of the present invention is directed to a plasma treating apparatus including a structure having a passage through which a fluid flows, a first electrode provided in a middle of the passage, crossing a first fluid passing surface and occupying only a part of the first fluid passing surface, a second electrode provided in the middle of the passage at an upstream side of the first electrode, crossing a second fluid passing surface and occupying only a part of the second fluid passing surface, a third electrode provided in the middle of the passage at a downstream side of the first electrode, crossing a third fluid passing surface and occupying only a part of the third fluid passing surface, a pulsed power supply for generating a pulse voltage between a first pole and a second pole, and a connecting line for electrically connecting the first electrode to the first pole and electrically connecting the second electrode and the third electrode to the second pole, wherein the first electrode and the second electrode are opposed apart in an axial direction of the passage and the first electrode and the third electrode are opposed apart in the axial direction of the passage.

According to a second aspect of the present invention, in the first aspect of the present invention, the second electrode and the third electrode do not overlap with each other as seen in the axial direction of the passage.

According to a third aspect of the present invention, in the first or second aspect of the present invention, the first electrode and the second electrode cross each other and the first electrode and the third electrode cross each other as seen in the axial direction of the passage, and a crossing position of the first electrode and the second electrode and a crossing position of the first electrode and the third electrode do not overlap with each other.

According to a fourth aspect of the present invention, in any one of the first to third aspects of the present invention, the first electrode includes a first discharging part which has a surface formed by an insulator and is opposed to the second electrode and the third electrode.

According to a fifth aspect of the present invention, in any one of the first to fourth aspects of the present invention, the second electrode includes a second discharging part which has a surface formed by an insulator and is opposed to the first electrode, and the third electrode includes a third discharging part which has a surface formed by an insulator and is opposed to the first electrode.

According to a sixth aspect of the present invention, in any one of the first to fifth aspects of the present invention, the first electrode is a cathode and the second electrode and the third electrode are anodes, and the first electrode includes a first plasma grounding part which is provided in an edge portion of the first fluid passing surface and has a good conductor connected to the first pole through the connecting line that is exposed to a surface.

According to a seventh aspect of the present invention, in any one of the first to fifth aspects of the present invention, the first electrode is an anode and the second electrode and the third electrode are cathodes, the second electrode includes a second plasma grounding part which is provided in an edge portion of the second fluid passing surface and has a good conductor connected to the second pole through the connecting line that is exposed to a surface, and the third electrode includes a third plasma grounding part which is provided in an edge part of the third fluid passing surface and has a good conductor connected to the third pole through the connecting line that is exposed to a surface.

According to the first to seventh aspects of the present invention, a plasma is generated on the upstream side and the downstream side of the first electrode so that an efficiency of a treatment through the plasma can be enhanced. Moreover, terminals of the first electrode, the second electrode and the third electrode do not serve as starting or ending points of a discharge. Consequently, durabilities of the first electrode, the second electrode and the third electrode can be enhanced.

According to the second and third aspects of the present invention, a fluid which is not sufficiently activated at the upstream side of the first electrode is sufficiently activated at the downstream side of the first electrode. Accordingly, the efficiency of the treatment through the plasma can be enhanced.

According to the fourth and fifth aspects of the present invention, a discharge is a dielectric barrier discharge and an arc discharge is suppressed, and a streamer discharge for efficiently activating a fluid is generated stably.

According to the sixth and seventh aspects of the present invention, an electron can easily be supplied to an ion sheath layer so that the efficiency of the treatment through the plasma can be enhanced.

These and other objects, features, aspects and advantages of the present invention will be more apparent from the following detailed description of the present invention in conjunction with the accompanying drawings.

DETAILED DESCRIPTION OF THE INVENTION (Outline of Plasma Treating Apparatus 1004)

Figure 1:
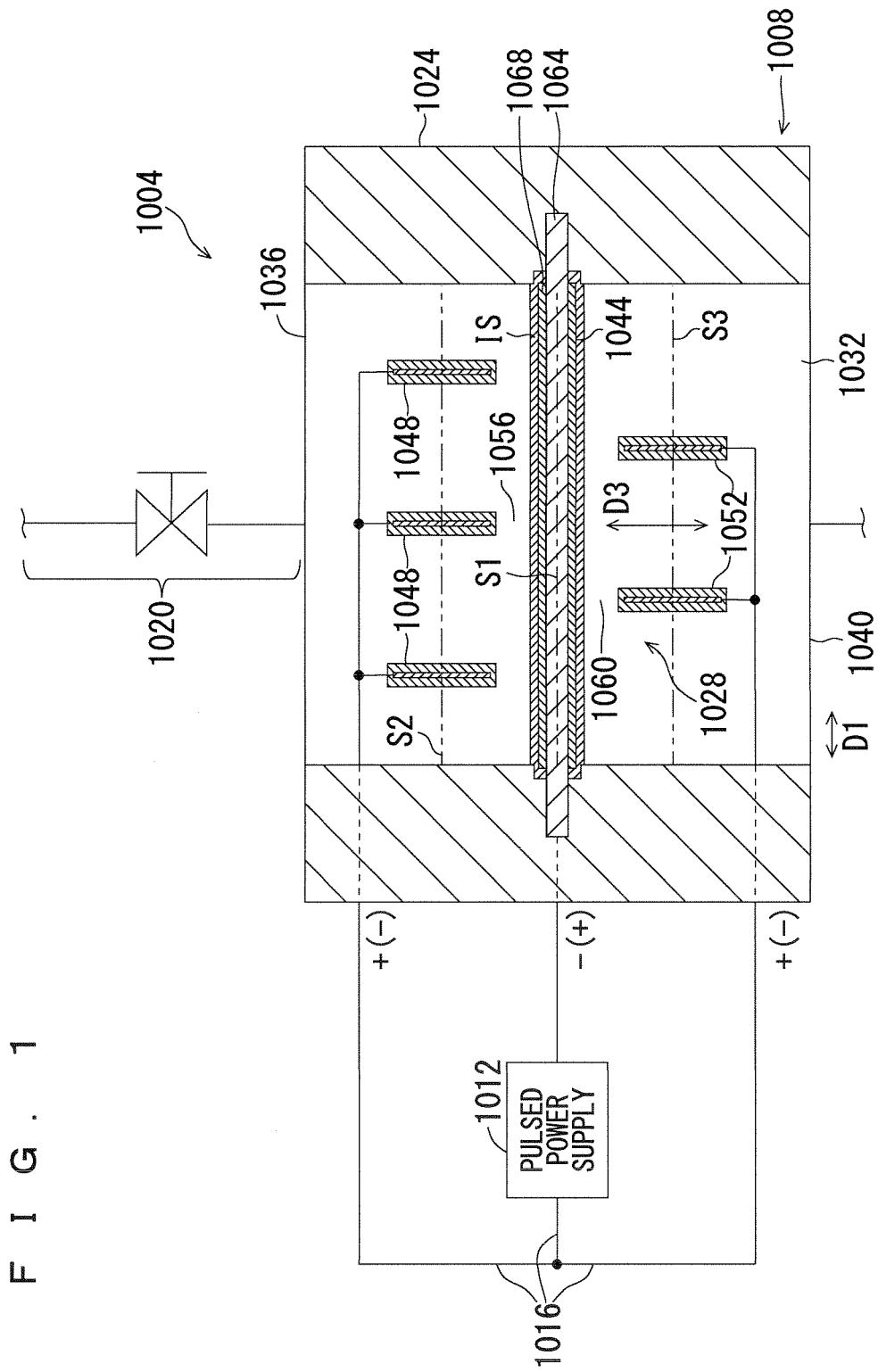
FIG. 1 is a schematic diagram showing a plasma treating apparatus according to a preferred embodiment of the present invention.

FIG. 1 is a schematic diagram showing a plasma treating apparatus 1004 according to a preferred embodiment of the present invention. FIG. 1 shows a section of a reactor 1008 in the plasma treating apparatus 1004 and accessories thereof.

As shown in FIG. 1, the plasma treating apparatus 1004 includes the reactor 1008 for generating a plasma, a pulsed power supply 1012 for generating a pulse voltage, a connecting line 1016 for electrically connecting the pulsed power supply 1012 to the reactor 1008, and a gas supply circuit 1020 for supplying a gas. The plasma treating apparatus 1004 generates a plasma in an inner portion of the reactor 1008 while supplying a gas to the inner portion of the reactor 1008, and causes the plasma to act on the gas, thereby activating the gas. The "activation" implies that a reactivity of the gas is enhanced, for example, chemical species are excited to a higher energy level, an ion is generated, or a radical is generated.

(Outline of Reactor 1008)

As shown in FIG. 1, the reactor 1008 includes a chamber 1024 having a passage 1032 through which a gas flows, and an electrode array part 1028 for applying an electric field.

It is sufficient that the chamber 1024 is a structure having the passage 1032, and a structure, a material or the like is not restricted if the chamber 1024 is not damaged by a gas flowing in the passage 1032, an electric field to be applied by the electrode array part 1028, a discharge and a plasma which are generated by the application of the electric field or the like.

The gas sucked into a sucking port 1036 at one of end of the passage 1032 flows in a direction in which the passage 1032 is extended, that is, an axial direction D3 of the passage 1032, passes through the electrode array part 1028, is activated by a plasma generated in a position of the electrode array part 1028 and is discharged from a discharging port 1040 at the other end of the passage 1032.

The electrode array part 1028 is provided in a middle of the passage 1032. The electrode array part 1028 is a discharging part for applying an electric field which is almost parallel with the axial direction D3 of the passage 1032, thereby generating a discharge, and is also an incomplete blocking part for incompletely blocking the passage 1032, that is, a gas passing part for causing the gas to pass therethrough. When the gas passes through the electrode array part 1028, consequently, the gas is efficiently activated uniformly by a plasma.

(Structure of Electrode Array Part 1028)

Figure 2:
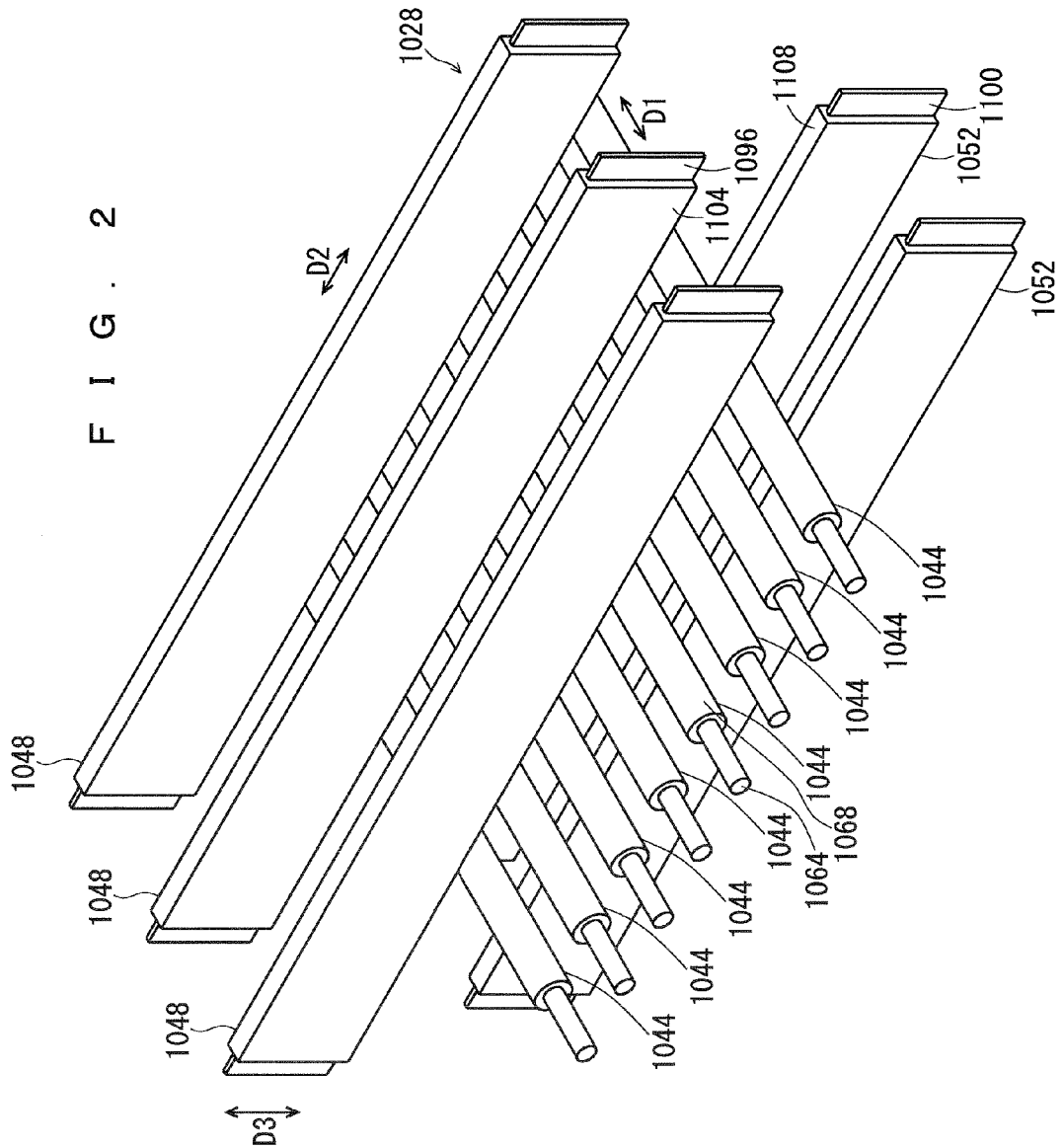
FIG. 2 is a perspective view showing an electrode array part.
Figure 3:
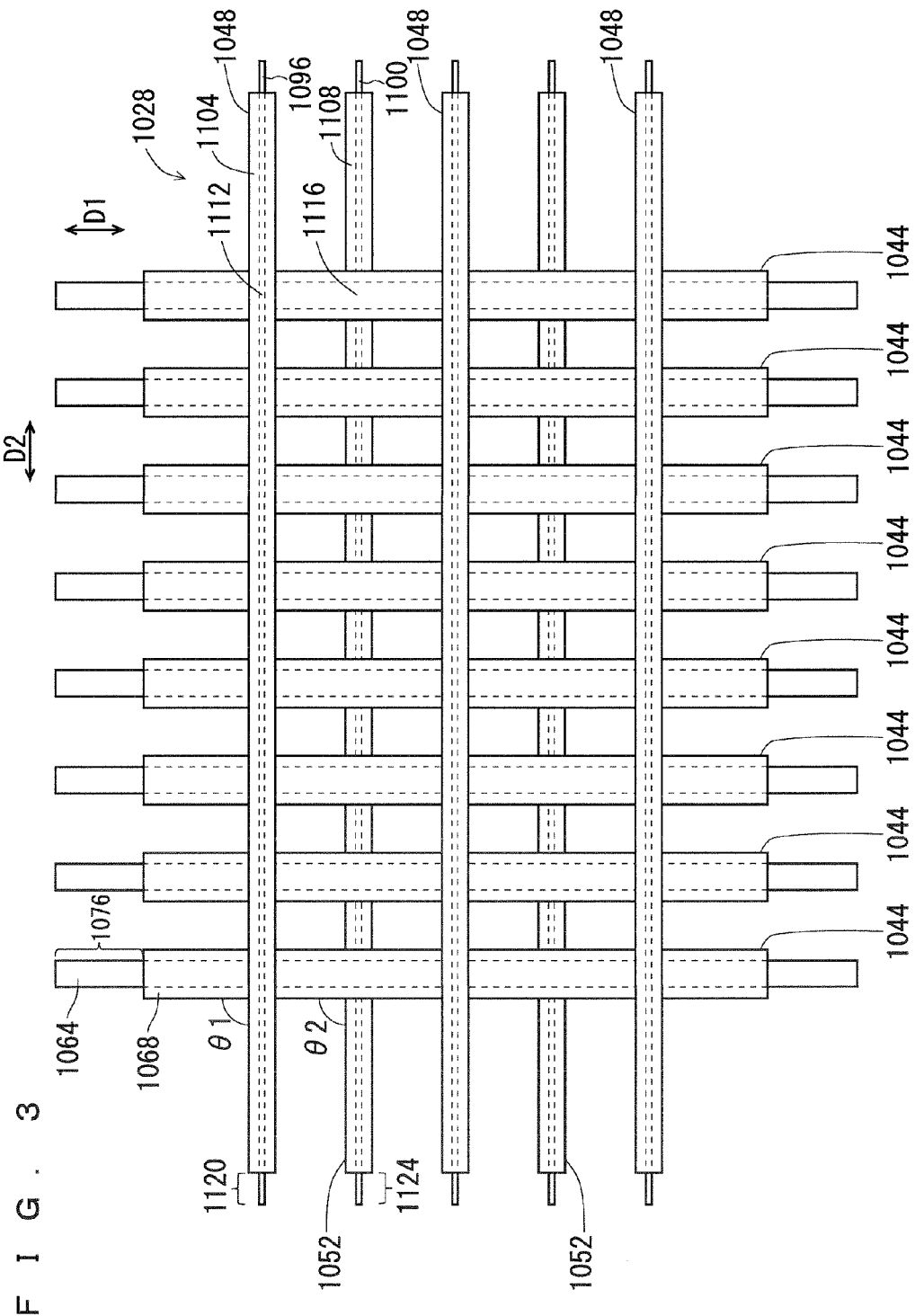
FIG. 3 is a top view showing the electrode array part.
Figure 4:
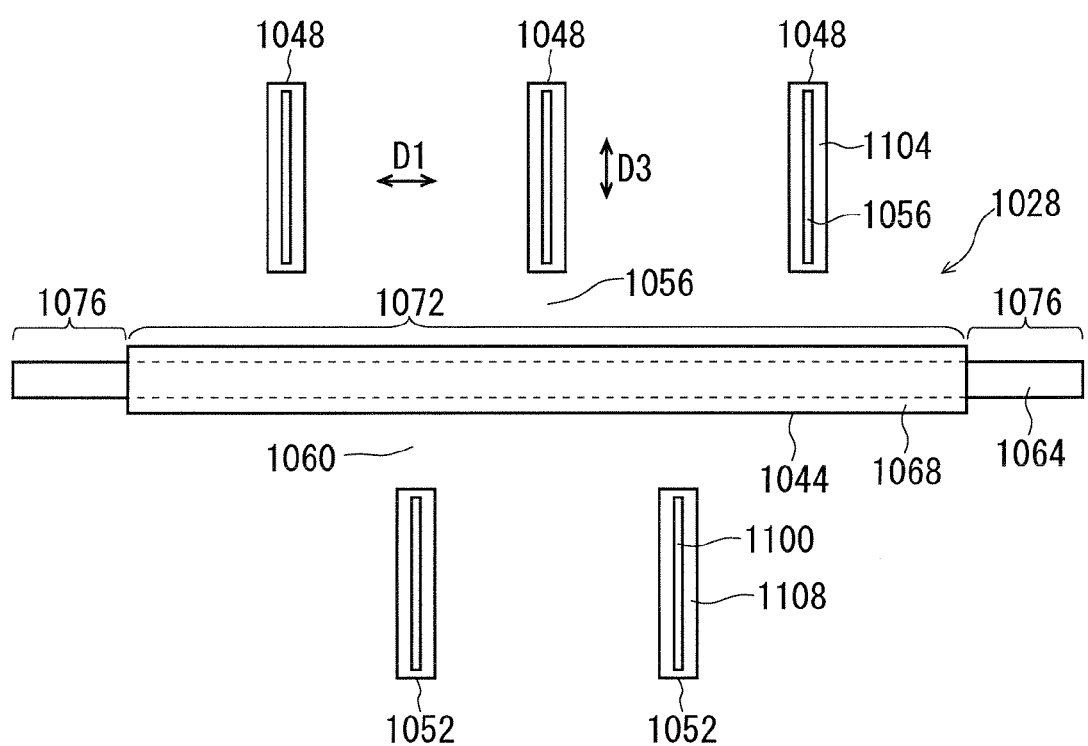
FIG. 4 is a front view showing the electrode array part.
Figure 5:
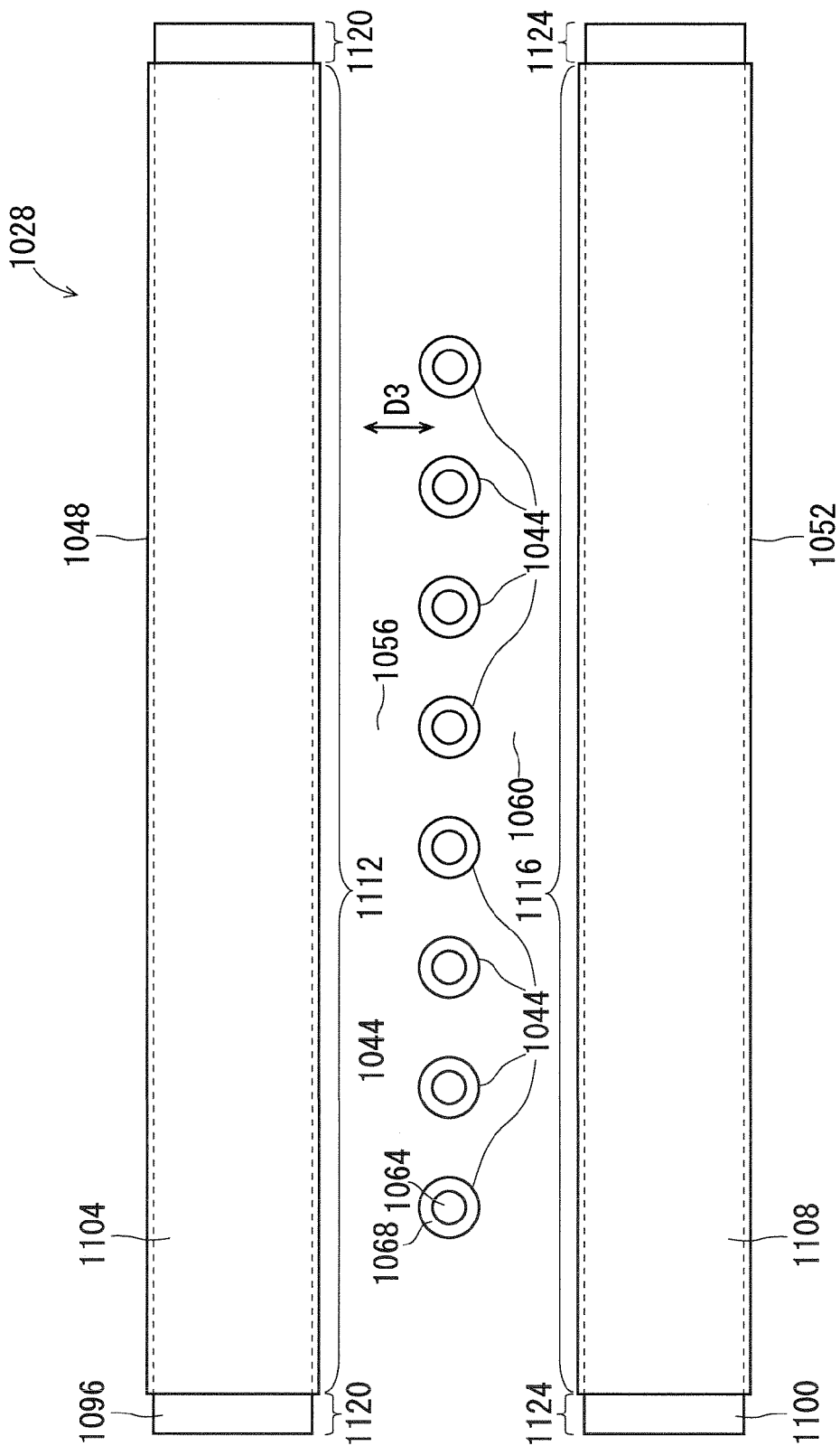
FIG. 5 is a side view showing the electrode array part.

FIGS. 2 to 5 are schematic views showing the electrode array part 1028. FIG. 2 is a perspective view, FIG. 3 is a top view, FIG. 4 is a front view and FIG. 5 is a side view.

As shown in FIGS. 1 to 5, the electrode array part 1028 has a structure in which a second electrode 1048, the first electrode 1044 and the third electrode 1052 are arranged in this described order in the axial direction D3 of the passage 1032. The second electrode 1048 is provided on an upstream side of the first electrode 1044 and the third electrode 1052 is provided on a downstream side of the first electrode 1044.

(Selection of Anode and Cathode)

In the case where the first electrode 1044 is set to be the cathode and the second electrode 1048 and the third electrode 1052 are set to be the anodes as shown in FIG. 1, the connecting line 1016 connects the first electrode 1044 to a negative electrode of the pulsed power supply 1012 and connects the second electrode 1048 and the third electrode 1052 to a positive electrode of the pulsed power supply 1012. Consequently, an electric field directed from the second electrode 1048 toward the first electrode 1044 is applied to a first gap 1056 between the first electrode 1044 and the second electrode 1048, and an electric field directed from the third electrode 1052 toward the first electrode 1044 is applied to a second gap 1060 between the first electrode 1044 and the third electrode 1052. Moreover, an ion sheath layer IS is generated in the vicinity of a side of the first electrode 1044 which is opposed to the second electrode 1048 and the third electrode 1052 and a discharge is generated in the first gap 1056 and the second gap 1060, and a plasma is generated in the first gap 1056 and the second gap 1060.

In the case where the first electrode 1044 is set to be the anode and the second electrode 1048 and the third electrode 1052 are set to be the cathodes, the connecting line 1016 connects the first electrode 1044 to the positive electrode of the pulsed power supply 1012 and connects the second electrode 1048 and the third electrode 1052 to the negative electrode of the pulsed power supply 1012. Consequently, an electric field directed from the first electrode 1044 toward the second electrode 1048 is applied to the first gap 1056, and an electric field directed from the first electrode 1044 toward the third electrode 1052 is applied to the second gap 1060. Moreover, an ion sheath layer (not shown) is generated on a side of the second electrode 1048 and the third electrode 1052 which is opposed to the first electrode 1044 and a discharge is generated in the first gap 1056 and the second gap 1060, and a plasma is generated in the first gap 1056 and the second gap 1060. Since the second electrode 1048 and the third electrode 1052 are the cathodes, the first electrode 1044 to which a high voltage is applied is shielded by the second electrode 1048 and the third electrode 1052 so that an insulation can easily be ensured.

In both the cases where the first electrode 1044 is the cathode and the first electrode 1044 is the anode, the plasma is generated on the upstream and downstream sides of the first electrode 1044 so that an efficiency of a treatment through the plasma is enhanced.

(Shape and Arrangement of First Electrode 1044)

As shown in FIGS. 1 to 5, the first electrode 1044 has a shape of a bar and crosses a first fluid passing surface S1. The "cross" implies that the first electrode 1044 gets out of one place of an internal wall of the passage 1032 and enters the other place of the internal wall of the passage 1032 via an inner part of the passage 1032. By causing the first electrode 1044 to cross the first fluid passing surface S1, a terminal of the first electrode 1044 which tends to be damaged is prevented from serving as a starting or ending point of a discharge opposite to the second electrode 1048 and the third electrode 1052. Consequently, the durability of the first electrode 1044 can be enhanced.

The first electrode 1044 is extended in a first direction D1 which is perpendicular to the axial direction D3 of the passage 1032, and is thinly arranged in a second axial direction D2 which is perpendicular to the axial direction D3 of the passage 1032 and is perpendicular to the first direction D1. The "thinly" implies that the adjacent first electrodes 1044 do not come into close contact with each other and an opening through which the gas passes is provided between the first electrodes 1044 which are adjacent to each other. A gap between the first electrodes 1044 which are adjacent to each other is a band-shaped opening, and the first electrode 1044 occupies only a part of the first fluid passing surface S1, thereby blocking the first fluid passing surface S1 incompletely.

(Structure of First Electrode 1044)

As shown in FIGS. 2 to 5, the first electrode 1044 has a structure in which portions other than the vicinity of the terminal of a bar 1064 formed by a good conductor is covered with a cover 1068 formed by an insulator. In the case where the first electrode 1044 is set to be the cathode, the bar 1064 is connected to the negative electrode of the pulsed power supply 1012 through the connecting line 1016. In the case where the first electrode 1044 is set to be the anode, the bar 1064 is connected to the positive electrode of the pulsed power supply 1012 through the connecting line 1016.

(First Charging Part 1072)

As shown in FIG. 4, a first charging part 1072 including the cover 1068 and having a surface formed by an insulator in the first electrode 1044 is separated in the axial direction D3 of the passage 1032 and is opposed to the second electrode 1048 and the third electrode 1052. The "having a surface formed by an insulator" is sufficient if at least the surface is the insulator. Accordingly, it is not indispensable that the good conductor is buried in an inner part.

The surface of the first discharging part 1072 which is formed by the insulator contributes to a state in which a discharge is a dielectric barrier discharge, an arc discharge is suppressed and a streamer discharge for efficiently activating a gas is generated stably.

(First Plasma Grounding Part 1076)

As shown in FIG. 4, a first plasma grounding part 1076 having no cover 1068 and having the good conductor exposed to the surface in the first electrode 1044 is placed in an edge portion of the first gas passing surface S1. In the case where the first electrode 1044 is the cathode, the first plasma grounding part 1076 comes into contact with an end of the ion sheath layer IS to apply a ground potential to the ion sheath layer IS, thereby supplying an electron to the ion sheath layer IS. Consequently, the electron is easily supplied to the ion sheath layer IS so that an efficiency of a treatment through a plasma can be enhanced. The "edge portion" implies a range provided in contact with the ion sheath layer IS, that is, a range having a certain width in the vicinity of the outer periphery of the first fluid passing surface S1. In the case where the first electrode 1044 is the anode, the first plasma grounding part 1076 does not need to be provided.

(Separation of First Discharging Part 1072 and First Plasma Grounding Part 1076)

In the case where the first electrode 1044 shown in FIGS. 1 to 5 is employed, the first discharging part 1072 and the first plasma grounding part 1076 are integrated with each other. This contributes to a decrease in the number of components. The first discharging part 1072 and the first plasma grounding part 1076 may be separated from each other or the whole first discharging part 1072 does not need to be a good conductor.

(Sectional Shape of First Electrode 1044 and Bar 1064)

As shown in FIGS. 2 to 5, the first electrode 1044 has a circular sectional shape and the bar 1064 also has a circular sectional shape. Consequently, a sharp portion is lessened in the first discharging part 1072, resulting in a suppression in a damage of the first discharging part 1072 due to a concentration of an electric field on the sharp portion. When the sharp portion is lessened, moreover, a defect which might cause the damage is prevented from being present in the cover 1068. The first electrode 1044 and the bar 1064 may have the sectional shapes which have less sharp portions other than the circular shape, for example, may have elliptical sectional shapes. In the case where the formation of the cover 1068 is permitted to be slightly hard, the first electrode 1044 and the bar 1064 may have sectional shapes other than the circular shape.

(Opening Ratio of First Gas Passing Surface S1)

It is desirable that a ratio of an area of the opening to an area of the first fluid passing surface S1 seen in the axial direction D3 of the passage 1032 should be equal to or higher than 30%. When the opening ratio of the first fluid passing surface S1 is lower than a lower limit value, a pressure loss of the first electrode 1044 is increased so that the efficiency of the treatment through the plasma tends to be reduced.

(Width of First Electrode 1044)

It is desirable that a width of the first electrode 1044 seen in the axial direction D3 of the passage 1032 should be 0.3 to 5 mm. If the width of the first electrode 1044 exceeds the upper limit value, the pressure loss of the first electrode 1044 is increased so that the efficiency of the treatment through the plasma tends to be reduced. If the width of the first electrode 1044 is smaller than the lower limit value, a strength of the first electrode 1044 is reduced so that the first electrode 1044 tends to be damaged.

(Material of First Electrode 1044)

Although a material of the bar 1064 is not particularly restricted, it is desirable to employ a metal or an alloy which is damaged with difficulty by a discharge and a plasma and has a high heat resistance. The metal includes Pt (platinum), W (tungsten), Mo (molybdenum) and the like. The alloy includes a nickel-chromium (Ni—Cr) alloy, WC (tungsten carbide), a nickel-based superalloy and the like.

Although a material of the cover 1068 is not particularly restricted, it is desirable to employ a resin or ceramics which is damaged with difficulty by the discharge and the plasma and has a high heat resistance. The resin includes a fluorine resin, a polyimide based resin and the like. The ceramics includes alumina ($Al_2O_3$), zirconia ($ZrO_2$), silicon carbide (SiC), magnesia (MgO) and the like.

The material of the bar 1064 may be set to be a semiconductor and the cover 1068 formed by the insulator may be omitted. In this case, a portion of the bar 1064 which crosses the first fluid passing surface S1 serves as the first discharging part 1072 and the first plasma grounding part 1076. Although a type of the semiconductor is not particularly restricted, it is desirable to employ ceramics which is damaged with difficulty by the discharge and the plasma and has a high heat resistance. The ceramics includes S1 impregnated silicon carbide (SiC) and the like.

(Formation of Cover 1068 through Gel Cast Method)

Although a method of forming the cover 1068 is not particularly restricted, it is desirable to form the cover 1068 by covering a surface of the bar 1064 with a compact of ceramics powder by the gel cast method, thereby burning the compact in the case where the material of the cover 1068 is the ceramics. Consequently, it is possible to prevent a defect from being present in the cover 1068.

(Deformation of Array of First Electrode 1044)

Although FIGS. 1 to 5 show the case where the first electrode 1044 is arranged evenly, the first electrode 1044 may be arranged unevenly. For example, the first electrode 1044 may be arranged to be relatively dense on a center of the passage 1032 in which a flow rate of the gas is relatively high, and the first electrode 1044 may be arranged to be relatively thin around the passage 1032 in which the flow rate of the gas is relatively low.

Although FIGS. 1 to 5 show the case where the first electrode 1044 is arranged in parallel, moreover, electrodes may be arranged in non-parallel.

(First Electrode 1078 having Branch)

The first electrode 1044 which is straight, has no branch (no crossing) and has a shape of a bar shown in FIGS. 2 to 5 has an advantage that the cover 1068 having no defect can easily be formed. However, it is also possible to employ a first electrode 1078 having the branch in place of the first electrode 1044.

Figure 6:
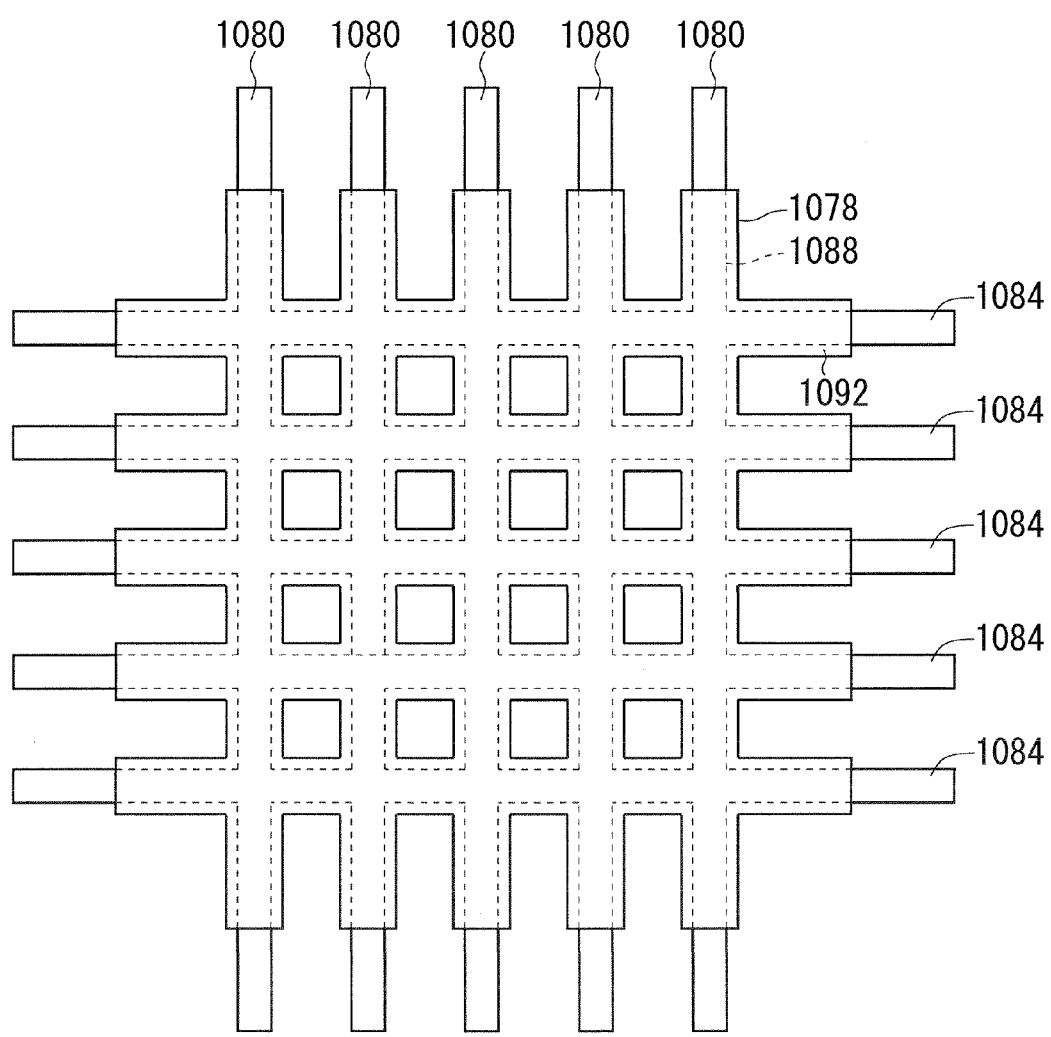
FIG. 6 is a plan view showing a first electrode taking a shape of a grid.

FIG. 6 is a schematic view showing the first electrode 1078 having the branch and having a shape of a grid. FIG. 6 is a top view showing the first electrode 1078 seen in the same direction as that in FIG. 3.

As shown in FIG. 6, it is also possible to employ the first electrode 1078 in which a grid 1088 formed by a good conductor having a bar 1080 extended in one of directions and a bar 1084 extended in the other direction cross each other is coated with a cover 1092 formed by an insulator. In the case where the first electrode 1078 is employed, an opening has a square shape. It is also possible to further change the shape of the grid 1088, thereby varying an opening to have a two-dimensional shape other than a square shape, for example, a polygonal shape such as a hexagonal shape, a circular shape and the like. It is also possible to employ the first electrode obtained by coating a punching metal with a cover formed by an insulator.

(Shape and Arrangement of Second Electrode 1048 and Third Electrode 1052)

As shown in FIGS. 1 to 5, the second electrode 1048 and the third electrode 1052 are plate-shaped and cross a second fluid passing surface S2 and a third fluid passing surface S3 respectively. By causing the second electrode 1048 and the third electrode 1052 to cross the second fluid passing surface S2 and the third fluid passing surface S3 respectively, the terminals of the second electrode 1048 and the third electrode 1052 which tend to be damaged can be prevented from serving as starting or ending points of a discharge opposite to the first electrode 1044. Thus, it is possible to enhance the durability of each of the second electrode 1048 and the third electrode 1052.

Main surfaces of the second electrode 1048 and the third electrode 1052 are parallel with the axial direction D3 of the passage 1032. Accordingly, the second electrode 1048 and the third electrode 1052 seen in the axial direction D3 of the passage 1032 have a projection shape of a bar (a slender shape). In the same manner as in the case of the first electrode 1044, a branch may be provided in the projection shapes of the second electrode 1048 and the third electrode 1052 as seen in the axial direction D3 of the passage 1032.

The second electrode 1048 and the third electrode 1052 are extended in the second direction D2 which is perpendicular to the axial direction D3 of the passage 1032, and are arranged thinly in the first direction D1 which is perpendicular to the axial direction D3 of the passage 1032 and is perpendicular to the second direction D2. A gap between the second electrodes 1048 which are adjacent to each other and a gap between the third electrodes 1052 which are adjacent to each other are band-shaped openings so that the second electrode 1048 and the third electrode 1052 occupy only a part of the second fluid passing surface S2 and the third fluid passing surface S3 respectively. Consequently, the second fluid passing surface S2 and the third fluid passing surface S3 are blocked incompletely.

(Structure of Second Electrode 1048 and Third Electrode 1052)

As shown in FIGS. 2 to 5, the second electrode 1048 and the third electrode 1052 have a structure in which portions other than the vicinity of the terminals of rectangular plates 1096 and 1100 formed by good conductors are coated with covers 1104 and 1108 formed by an insulator. In the case where the second electrode 1048 and the third electrode 1052 are the cathodes, the rectangular plates 1096 and 1100 are connected to the negative electrode of the pulsed power supply 1012 through the connecting line 1016. In the case where the second electrode 1048 and the third electrode 1052 are the anodes, the rectangular plates 1096 and 1100 are connected to the positive electrode of the pulsed power supply 1012 through the connecting line 1016.

(Second Discharging Part 1112 and Third Discharging Part 1116)

As shown in FIG. 3 a second discharging part 1112 and a third discharging part 1116 which have the covers 1104 and 1108 and have surfaces formed by insulators in the second electrode 1048 and the third electrode 1052 are opposed to the first electrode 1044 apart in the axial direction D3 of the passage 1032.

The surfaces of the second discharging part 1112 and the third discharging part 1116 which are formed by the insulators contribute to a state in which a discharge is set to be a dielectric barrier discharge, an arc discharge is suppressed and a streamer discharge for efficiently activating a gas is generated stably.

(Second Plasma Grounding Part 1120 and Third Plasma Grounding Part 1124)

As shown in FIG. 5, a second plasma grounding part 1120 and a third plasma grounding part 1124 which have no covers 1104 and 1108 and have the good conductors exposed to the surfaces in the second electrode 1048 and the third electrode 1052 are placed in edge portions of the second gas passing surface S2 and the third gas passing surface S3, respectively. In the case where the second electrode 1048 and the third electrode 1052 are the cathodes, the second plasma grounding part 1120 and the third plasma grounding part 1124 come into contact with an end of the ion sheath layer to apply a ground potential to the ion sheath layer, thereby supplying an electron to the ion sheath layer. Consequently, the electron is easily supplied to the ion sheath layer so that an efficiency of a treatment through plasma can be enhanced. The "edge portion" implies a range provided in contact with the ion sheath layer and having a certain width in the vicinity of outer peripheries of the second gas passing surface S2 and the third gas passing surface S3. In the case where the second electrode 1048 and the third electrode 1052 are the anodes, the second plasma grounding part 1120 and the third plasma grounding part 1124 do not need to be provided.

In the same manner as in the case of the first electrode 1044, the second discharging part 1112 and the second plasma grounding part 1120 may be separated from each other or the third discharging part 1116 and the third plasma grounding part 1124 may be separated from each other. The second discharging part 1112 and the third discharging part 1116 may be wholly formed by insulators in the same manner as in the case of the first electrode 1044.

(Deformation of Second Electrode 1048 and Third Electrode 1052)

Even if the second electrode 1048 and the third electrode 1052 are extended or shortened in the axial direction D3 of the passage 1032, the second electrode 1048 and the third electrode 1052 seen in the axial direction D3 of the passage 1032 still have the projection shapes of a bar and a shape on the opposite side to the first electrode 1044 which mainly contributes to the discharge is not changed. Accordingly, the second electrode 1048 and the third electrode 1052 may be extended or shortened in the axial direction D3 of the passage 1032.

Moreover, the sectional shapes of the ends of the second electrode 1048 and the third electrode 1052 at an opposite side to the first electrode 1044 may be rounded to have a semicircular shape or the like and the sectional shapes of the ends of the rectangular plates 1096 and 1100 on the opposite side to the first electrode 1044 may be rounded to have the semicircular shape or the like.

In addition, the second electrode 1048 and the third electrode 1052 may be perforated members having the same shape as a punching metal seen in the axial direction D3 of the passage.

(Opening Ratio of Second Gas Passing Surface S2 and Third Gas Passing Surface S3)

In the same manner as in the case of the opening ratio of the first gas passing surface S1, it is desirable that a ratio of an area of an opening to an area of the second gas passing surface S2 seen in the axial direction D3 of the passage 1032 and a ratio of the opening to an area of the third gas passing surface S3 seen in the axial direction D3 of the passage 1032 should be equal to or higher than 30%. The reason is also the same as in the case of the opening ratio of the first gas passing surface S1.

(Width of Second Electrode 1048 and Width of Third Electrode 1052)

In the same manner as in the case of the width of the first electrode 1044, it is desirable that a width of the second electrode 1048 seen in the axial direction D3 of the passage 1032 and that of the third electrode 1052 seen in the axial direction D3 of the passage 1032 should be 0.3 to 5 mm. The reason is also the same as in the case of the width of the first electrode 1044.

(Common Point to First Electrode 1044)

Materials of the rectangular plates 1096 and 1100 and the covers 1104 and 1108 are selected in the same manner as the materials of the bar 1064 and the cover 1068, respectively. In the same manner as in the case of the first electrode 1044, it is also desirable that the covers 1104 and 1108 should also be formed by the gel cast method. In the same manner as in the case of the first electrode 1044, the second electrode 1048 and the third electrode 1052 may be arranged unevenly or in non-parallel.

(Zigzag Arrangement of Second Electrode 1048 and Third Electrode 1052 seen in Axial Direction D3 of Passage 1032)

As shown in FIGS. 3 and 4, the second electrode 1048 and the third electrode 1052 are zigzag arranged in such a manner that the second electrode 1048 and the third electrode 1052 do not overlap with each other as seen in the axial direction D3 of the passage 1032. Consequently, the gas which is not sufficiently activated at the upstream side of the first electrode 1044 is sufficiently activated at the downstream side of the first electrode 1044 so that an efficiency of a treatment through plasma can be enhanced.

Even if the second electrode 1048 and the third electrode 1052 overlap with each other wholly or partially as seen in the axial direction D3 of the passage 1032, however, the plasma treating apparatus 1004 sufficiently functions.

Although FIGS. 1 to 5 show the case where the second electrode 1048 and the third electrode 1052 are parallel with each other as seen in the axial direction D3 of the passage 1032, the second electrode 1048 and the third electrode 1052 may be non-parallel with each other.

(Arrangement of Crossing Position seen in Axial Direction D3 of Passage 1032)

The direction D1 in which the first electrode 1044 is extended and the direction D2 in which the second electrode 1048 and the third electrode 1052 are extended form 90°. As seen in the axial direction D3 of the passage 1032, accordingly, the first electrode 1044 and the second electrode 1048 cross each other at a right angle, and the first electrode 1044 an the third electrode 1052 cross each other at a right angle.

As shown in FIG. 3, a crossing angle θ1 of the first electrode 1044 with respect to the second electrode 1048 and a crossing angle θ2 of the first electrode 1044 with respect to the third electrode 1052 are 90° so that a distances from the first plasma grounding part 1076 to the second plasma grounding part 1120 and third plasma grounding part 1124 are increased and a discharge is prevented from being generated between the first plasma grounding part 1076, and the second plasma grounding part 1120 and third plasma grounding part 1124. In the case where other measures for suppressing a discharge are employed, both or either of the crossing angles θ1 and θ2 may be angles other than 90° and may be 0°.

As shown in FIG. 3, the first electrode 1044, the second electrode 1048 and third electrode 1052 are arranged in such a manner that a crossing position 1112 of the first electrode 1044 and the second electrode 1048 does not overlap with a crossing position of the first electrode 1044 and the third electrode 1052 as seen in the axial direction D3 of the passage 1032. Consequently, the crossing positions of the second discharging part 1112 and the third discharging part 1116 in which a discharge tends to occur do not overlap with each other. Therefore, the gas which is not sufficiently activated at the upstream side of the first electrode 1044 is sufficiently activated at the downstream side of the first electrode 1044 so that an efficiency of a treatment through plasma can be enhanced.

Even if the crossing positions of the second discharging part 1112 and the third discharging part 1116 overlap with each other wholly or partially as seen in the axial direction D3 of the passage 1032, however, the plasma treating apparatus 1004 sufficiently functions.

(First Gap 1056 and Second Gap 1060)

Although FIGS. 1 to 5 show the case where the first gap 1056 and the second gap 1060 are constant, both or either of the first gap 1056 and the second gap 1060 do/does not need to be constant. For example, both or either of the first gap 1056 and the second gap 1060 may be narrowed down on a center of the passage 1032 where a flow rate of the gas is relatively high, and both or either of the first gap 1056 and the second gap 1060 may be enlarged on the periphery of the passage 1032 where the flow rate of the gas is relatively low.

(Omission of Cover 1068, 1104 and 1108)

In order to cause a discharge to be a dielectric barrier discharge, it is desirable that all of the covers 1068, 1104 and 1108 should be provided. If a surface of any of the opposed discharging parts is formed by an insulator, a part of the covers 1068, 1104 and 1108 may be omitted. For example, the cover 1068 may be omitted or the covers 1104 and 1108 may be omitted.

(Pulsed Power Supply 1012)

If the pulsed power supply 1012 has a capability for generating a pulse voltage to cause a streamer discharge to occur without an occurrence of an arc discharge over the first gap 1056 and the second gap 1060, the form is not particularly restricted but it is desirable to employ an inductive energy storage (IES) type power supply (hereinafter, referred to as an "IES power supply") using an SI (electrostatic induction) thyristor for a switching element. The reason is as follows. Although the IES power supply is small-sized and simple, it is suitable for generating a pulse voltage having a remarkably high time rise ratio dV/dt of a voltage V in a rise and a small pulse width Δt, thereby causing a streamer discharge to occur.

Figure 7:
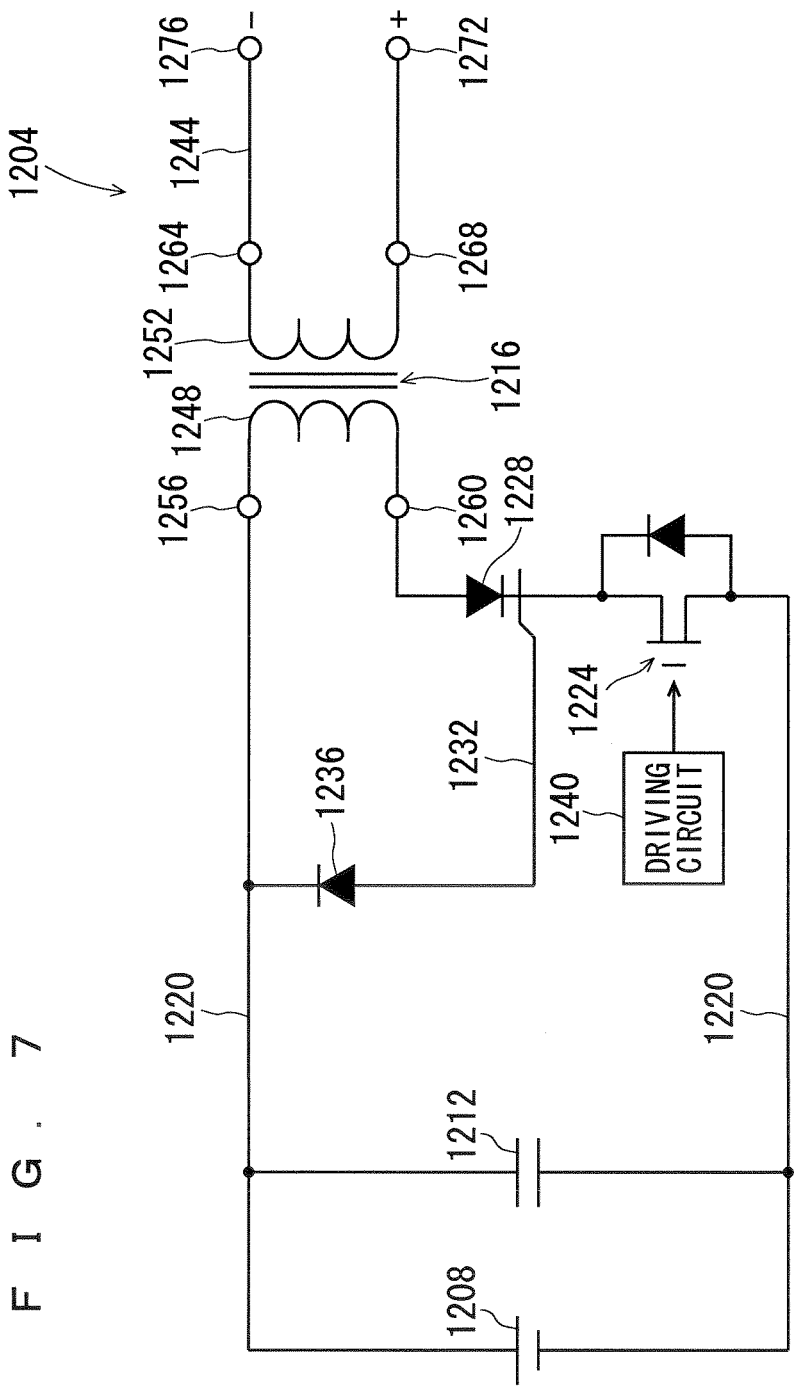
FIG. 7 is a circuit diagram showing an IES power supply.

FIG. 7 is a circuit diagram showing an example of a circuit of the IES power supply 1204. As shown in FIG. 7, the IES power supply 1204 includes a DC power supply 1208 for supplying a direct current, a capacitor 1212 for stabilizing a supply of the direct current from the DC power supply 1208, a transformer 1216 for storing an inductive energy, a supply path 1220 for the direct current to a primary winding 1248 of the transformer 1216, an MOSFET (Metal Oxide Semiconductor Field Effect Transistor) 1224 and an SI thyristor 1228 which open/close the supply path 1220, a bias applying path 1232 connected to a gate of the SI thyristor 1228, a diode 1236 for suppressing a flow of a current to the gate of the SI thyristor 1228 and permitting a current to flow out of the gate of the SI thyristor 1228, a driving circuit 1240 for driving the MOSFET 1224, and an output path 1244 for a pulse voltage applied from a secondary winding 1252 of the transformer 1216.

The SI thyristor 1228 and the MOSFET 1224 are inserted in series to the supply path 1220 to close the supply path 1220 when it is turned ON and to open the supply path 1220 when it is turned OFF. A first end 1256 of the primary winding 1248 is connected to a positive electrode of the DC power supply 1208 and one of ends of the capacitor 1212, an anode of the SI thyristor 1228 is connected to a second end 1260 of the primary winding 1248, a cathode of the SI thyristor 1228 is connected to a drain of the MOSFET 1224, and a source of the MOSFET 1224 is connected to a negative electrode of the DC power supply 1208 and the other end of the capacitor 1212. A gate of the SI thyristor 1228 is connected to the first end 1256 of the primary winding 1248 via the diode 1236 through the bias applying path 1232. The diode 1236 is inserted into the bias applying path 1232. A cathode of the diode 1236 is connected to the first end 1256 of the primary winding 1248, and an anode of the diode 1236 is connected to the gate of the SI thyristor 1228. The SI thyristor 1228 is positively biased through voltage driving and is negatively biased through current driving by the diode 1236. An inductor including a single winding may be used in place of the transformer 1216 to directly output a pulse voltage from the inductor.

(Summary of Operation of IES Power Supply 1204)

When an ON signal is started to be input from the driving circuit 1240 to the MOSFET 1224 and the MOSFET 1224 is then turned ON, the gate of the SI thyristor 1228 is positively biased so that the SI thyristor 1228 is also turned ON. Consequently, the supply path 1220 is closed. When the supply path 1220 is closed, a supply of a direct current to the primary winding 1248 is started so that storage of the inductive energy in the transformer 1216 is started.

When the ON signal is ended to be input from the driving circuit 1240 to the MOSFET 1224 so that the MOSFET 1224 is turned OFF, the gate of the SI thyristor 1228 is negatively biased by an induced electromotive force generated in the primary winding 1248 so that the SI thyristor 1228 is also turned OFF at a high speed. Consequently, the supply path 1220 is opened at a high speed. When the supply path 1220 is opened at a high speed, an induced electromotive force is generated in the secondary winding 1252 through a mutual induction to output a pulse voltage having a remarkably high time rise ratio dV/dt of a voltage V in a rise from the secondary winding 1252 to a portion between a positive electrode 1272 and a negative electrode 1276.

The more detailed operation principle of the IES power supply 1204 is described in "Ultrashort Pulse Generating Circuit (IES Circuit) through SI Thyristor", SI Device Symposium Lecture Collection (2002); Katsuji Iida, Ken Sakuma, for example.

(Summary of Waveform of Pulse Voltage)

It is desired that a pulse width of a pulse voltage should be approximately 10 to 1000 ns in a full width at half maximum (FWHM), a time change rate dV/dt of a voltage V in a rise should be approximately 30 to 3000 kV/the number of repetitions per unit time should be approximately 100 pps to several tens kpps, and a peak voltage should be approximately 10 to 30 kV. A desirable range is described as "approximately" because the desirable range might be larger than the range described above depending on a structure or a material of the reactor 1008, a pressure of a gas or a flow rate of the gas.

(Ion Sheath Layer)

In the case where a pulse voltage having a small pulse width Δt and a high time change rate dV/dt of the voltage V in the rise is applied to a portion between the anode and the cathode, thus, a thin ion sheath layer is generated along a gas passing surface provided on a surface of the cathode so that an ion and a radical in high densities are generated. On the other hand, when the pulse width is increased or the time change rate dV/dt of the voltage V in the rise is reduced, the ion sheath layer IS to be generated on the surface of the cathode is thickened so that the densities of the ion and the radical are reduced.

(Internal Pressure of Passage 1032)

An internal pressure of the passage 1032 is different depending on an example of a use of the plasma treating apparatus 1004. There might be the case where the internal pressure is maintained to be an atmospheric pressure, is reduced or is raised.

(Example of Use of Plasma Treating Apparatus 1004)

Figure 8:
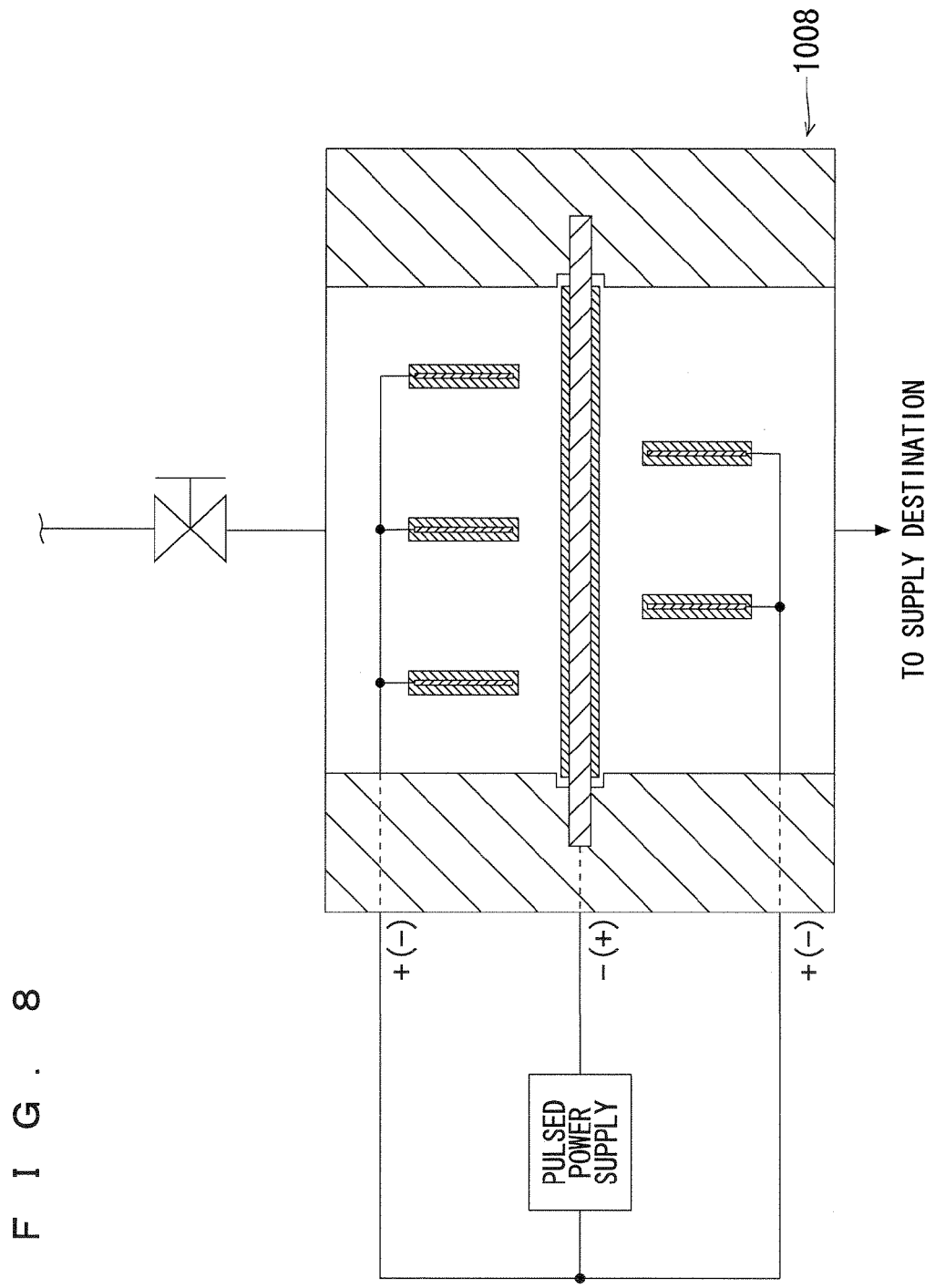
FIG. 8 is a schematic diagram for explaining an example of a use of a plasma treating apparatus.
Figure 9:
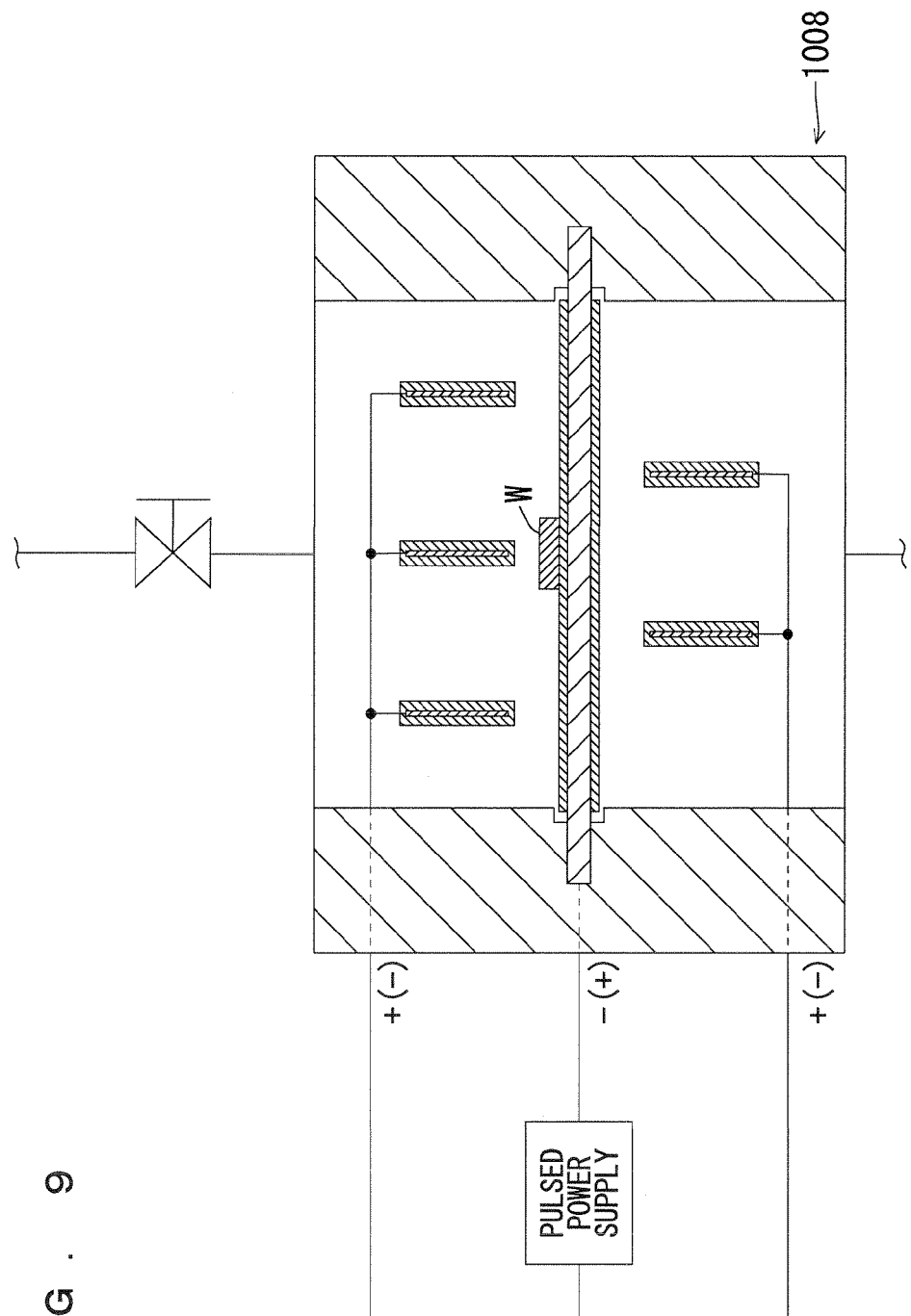
FIG. 9 is a schematic diagram for explaining an example of a use of a plasma treating apparatus.
Figure 10:
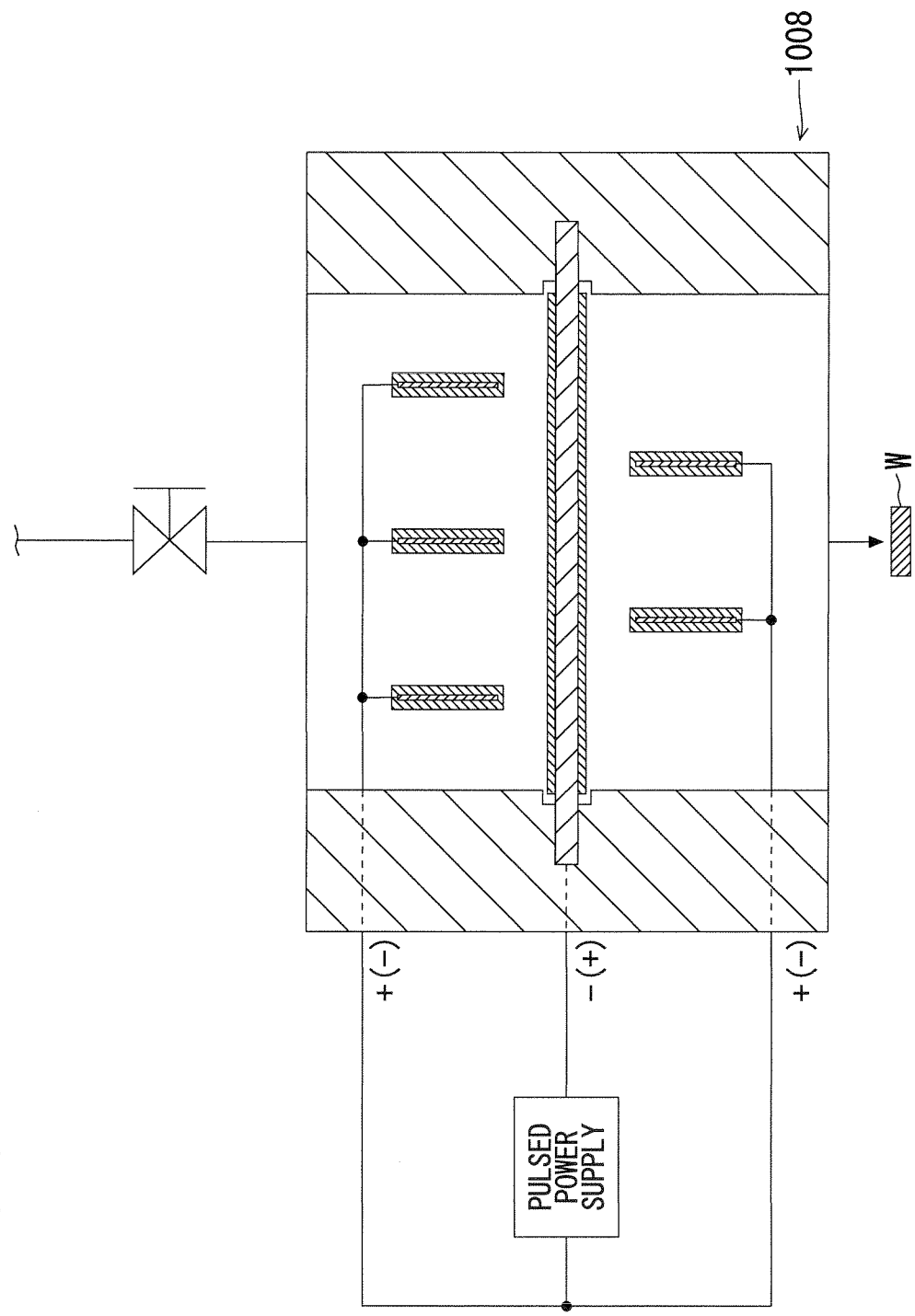
FIG. 10 is a schematic diagram for explaining an example of a use of a plasma treating apparatus.

FIGS. 8 to 10 are schematic diagrams for explaining an example of a use of the plasma treating apparatus 1004.

In the case where the plasma treating apparatus 1004 is used for activating a gas as shown in FIG. 8, plasma is generated in the reactor 1008 while the gas is supplied into the reactor 1008. The gas activated in the reactor 1008 is fed from the reactor 1008 to a supply destination. The supply destination includes an incinerator, a baking furnace and the like. In the case where the activated gas is supplied to the incinerator, the activated gas contributes to an enhancement in a combustion efficiency or the like. In the case where the activated gas is supplied to the baking furnace, the activated gas contributes to a promotion of a heat treatment or the like. In order to activate a liquid in place of the gas, more generally, it is also possible to use the plasma treating apparatus 1004 in order to activate a fluid. As a matter of course, in the case where the liquid is activated in place of a gas (a vapor), a liquid supply circuit for supplying a liquid is provided in place of the gas supply circuit 1020 (FIG. 1). Although a gas to be an activating target is not particularly restricted, it is nitrogen ($N_2$), water ($H_2O$), hydrogen peroxide ($H_2O_2$), tetrafluoromethane ($CF_4$), trifluoromethane ($CHF_3$) or the like, for example. Although a liquid to be an activating target is not particularly restricted, it is water ($H_2O$), alcohol, an acid aqueous solution, an alkaline aqueous solution or like, for example.

As shown in FIG. 9, in the case where the plasma treating apparatus 1004 is used for treating a surface of a target W formed of a solid, the target W is housed in the reactor 1008 so that plasma is generated in the reactor 1008 while a gas is supplied into the reactor 1008. Consequently, the plasma acts on the surface of the target W so that the surface of the target W is treated. The treatment of the surface includes a treatment for enhancing a wettability of the surface (reforming), a treatment for killing a microorganism sticking to the surface (a sterilization or a pasteurization) and the like.

Also in the case where the plasma treating apparatus 1004 is used for treating the surface of the target W formed by the solid, it is not indispensable to house the target W in the reactor 1008. As shown in FIG. 10, therefore, the activated gas may be sprayed onto the target W provided on an outside of the reactor 1008.

(Others)

Although the present invention has been described in detail, the description is only illustrative in all aspects and the present invention is not restricted to the above description. Innumerable variants which are not illustrated can be supposed without departing from the scope of the present invention.

The invention claimed is:

1. A plasma treating apparatus comprising:
  a structure having a passage through which a fluid flows;
  a first electrode provided in a middle of said passage, crossing a first fluid passing surface, occupying only a part of said first fluid passing surface, and having no branch;
  a second electrode provided in the middle of said passage at an upstream side of said first electrode, crossing a second fluid passing surface, occupying only a part of said second fluid passing surface and having no branch, said first electrode and said second electrode crossing each other as seen in an axial direction of said passage;
  a third electrode provided in the middle of said passage at a downstream side of said first electrode, crossing a third fluid passing surface, occupying only a part of said third fluid passing surface and having no branch, said first electrode and said third electrode crossing each other as seen in the axial direction of said passage;
  a pulsed power supply for generating a pulse voltage between a first pole and a second pole; and
  a connecting line for electrically connecting said first electrode to said first pole and electrically connecting said second electrode and said third electrode to said second pole,
  wherein said first electrode and said second electrode are opposed apart in an axial direction of said passage and said first electrode and said third electrode are opposed apart in the axial direction of said passage.

2. The plasma treating apparatus according to claim 1, wherein
  said second electrode and said third electrode do not overlap with each other as seen in the axial direction of said passage.

3. The plasma treating apparatus according to claim 1, wherein a crossing position of said first electrode and said second electrode and a crossing position of said first electrode and said third electrode do not overlap with each other.

4. The plasma treating apparatus according to claim 1, wherein
  said first electrode includes a first discharging part which has a surface formed by an insulator and is opposed to said second electrode and said third electrode.

5. The plasma treating apparatus according to claim 1, wherein
  said second electrode includes a second discharging part which has a surface formed by an insulator and is opposed to said first electrode, and
  said third electrode includes a third discharging part which has a surface formed by an insulator and is opposed to said first electrode.

6. The plasma treating apparatus according to claim 1, wherein
  said first electrode is a cathode and said second electrode and said third electrode are anodes, and
  said first electrode includes a first plasma grounding part which is provided in an edge portion of said first fluid passing surface and has a good conductor connected to said first pole through said connecting line that is exposed to a surface.

7. The plasma treating apparatus according to claim 1, wherein
  said first electrode is an anode and said second electrode and said third electrode are cathodes,
  said second electrode includes a second plasma grounding part which is provided in an edge portion of said second fluid passing surface and has a good conductor connected to said second pole through said connecting line that is exposed to a surface, and
  said third electrode includes a third plasma grounding part which is provided in an edge portion of said third fluid passing surface and has a good conductor connected to said second pole through said connecting line that is exposed to a surface.

8. A plasma treating apparatus comprising:
  a structure having a passage through which a fluid flows;
  a first electrode provided in a middle of said passage, crossing a first fluid passing surface and occupying only a part of said first fluid passing surface;
  a second electrode provided in the middle of said passage at an upstream side of said first electrode, crossing a second fluid passing surface and occupying only a part of said second fluid passing surface;
  a third electrode provided in the middle of said passage at a downstream side of said first electrode, crossing a third fluid passing surface and occupying only a part of said third fluid passing surface, said second electrode and said third electrode not overlapping with each other as seen in the direction in which said first electrode and said second electrode are apart;
  a pulsed power supply for generating a pulse voltage between a first pole and a second pole; and
  a connecting line for electrically connecting said first electrode to said first pole and electrically connecting said second electrode and said third electrode to said second pole,
  wherein said first electrode and said second electrode are opposed apart in an axial direction of said passage and said first electrode and said third electrode are opposed apart in the axial direction of said passage.

9. The plasma treating apparatus according to claim 8, wherein
  said first electrode and said second electrode cross each other and said first electrode and said third electrode cross each other as seen in the axial direction of said passage, and a crossing position of said first electrode and said second electrode and a crossing position of said first electrode and said third electrode do not overlap with each other.

10. The plasma treating apparatus according to claim 8, wherein
  said first electrode includes a first discharging part which has a surface formed by an insulator and is opposed to said second electrode and said third electrode.

11. The plasma treating apparatus according to claim 8, wherein
- said second electrode includes a second discharging part which has a surface formed by an insulator and is opposed to said first electrode, and
- said third electrode includes a third discharging part which has a surface formed by an insulator and is opposed to said first electrode.

12. The plasma treating apparatus according to claim 8, wherein
- said first electrode is a cathode and said second electrode and said third electrode are anodes, and
- said first electrode includes a first plasma grounding part which is provided in an edge portion of said first fluid passing surface and has a good conductor connected to said first pole through said connecting line that is exposed to a surface.

13. The plasma treating apparatus according to claim 8, wherein
- said first electrode is an anode and said second electrode and said third electrode are cathodes,
- said second electrode includes a second plasma grounding part which is provided in an edge portion of said second fluid passing surface and has a good conductor connected to said second pole through said connecting line that is exposed to a surface, and
- said third electrode includes a third plasma grounding part which is provided in an edge portion of said third fluid passing surface and has a good conductor connected to said second pole through said connecting line that is exposed to a surface.

* * * * *